United States Patent [19]

Szücs

[11] Patent Number: 4,750,407
[45] Date of Patent: Jun. 14, 1988

[54] HYDRAULIC POWER-ASSISTED STEERING GEAR, FIRST OF ALL FOR MOTOR VEHICLES

[75] Inventor: László Szücs, Budapest, Hungary

[73] Assignee: Autoipari Kutato Intezet, Budapest, Hungary

[21] Appl. No.: 713,103

[22] Filed: Mar. 15, 1985

Related U.S. Application Data

[63] Continuation of Ser. No. 458,509, Jan. 17, 1983, abandoned, which is a continuation of Ser. No. 174,274, Jul. 31, 1980, abandoned.

[30] Foreign Application Priority Data

Jul. 31, 1979 [HU] Hungary .............................. AU 427

[51] Int. Cl.⁴ .............................................. F15B 13/04
[52] U.S. Cl. .............................................. 91/422; 91/380
[58] Field of Search ................ 91/422, 380, 370, 371, 91/372, 373, 375 A, 375 R

[56] References Cited

U.S. PATENT DOCUMENTS

| | | | |
|---|---|---|---|
| 2,063,937 | 12/1936 | Kundig | 91/372 |
| 3,010,335 | 11/1961 | Foerster et al. | 91/380 |
| 3,602,101 | 8/1971 | Jablonsky et al. | 91/422 |
| 3,722,369 | 3/1973 | Maekawa et al. | 91/380 |
| 4,202,249 | 5/1980 | Jablonsky et al. | 91/422 |

Primary Examiner—Edward K. Look
Attorney, Agent, or Firm—Schweitzer & Cornman

[57] ABSTRACT

A power assisted steering gear having a movement transmitting drive member connected to and rotatable with the steering unit, one portion of which that determines the axis of rotation is formed by the connection between the steering nut and drive member. Another portion is formed by a ball pivot fitting into the nest of a double acting piston and a further ball pivot fitting into the nest of an axial slide valve of the piston which is set outside the axis of rotation.

5 Claims, 3 Drawing Sheets

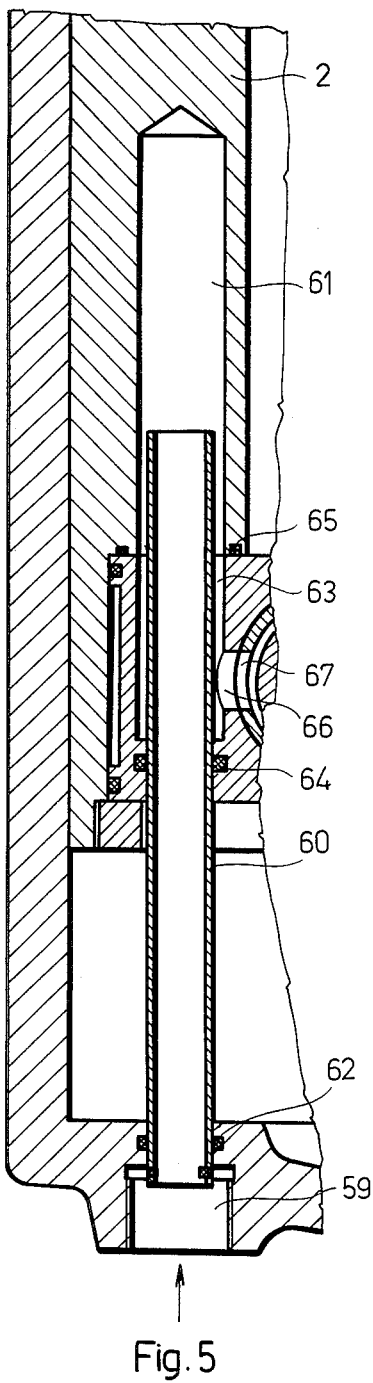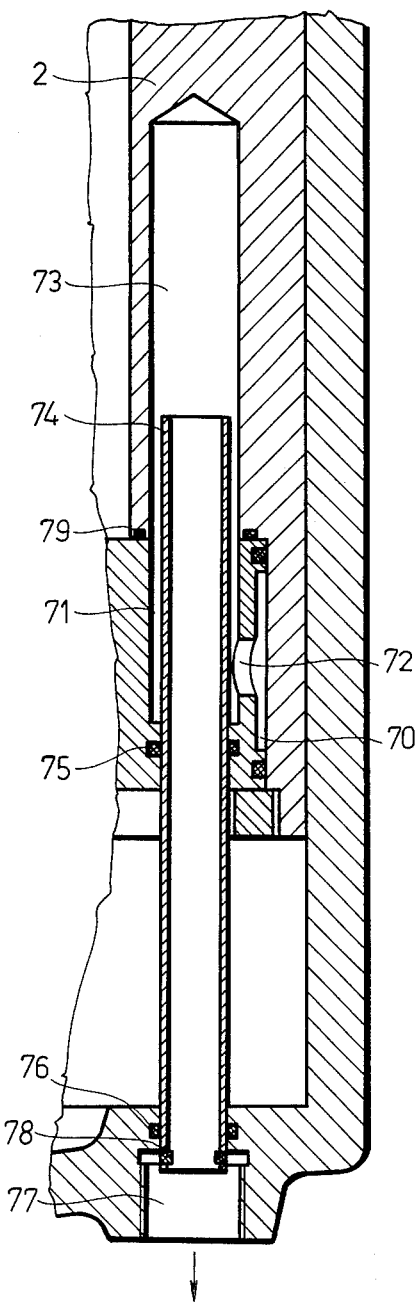

HYDRAULIC POWER-ASSISTED STEERING GEAR, FIRST OF ALL FOR MOTOR VEHICLES

This is a continuing application of application Ser. No. 458,509, filed on Jan. 17, 1983, now abandoned, which is a continuation of Ser. No. 174,274, filed on July 31, 1980, now abandoned.

The invention relates to hydraulic power-assisted steering gear operated manually and hydraulically, primarily for motor vehicles.

A power-assisted steering gear with double-acting hydraulic piston is known (GFR patent specification No. 1 816 295), in which the hydraulic fluid into the respective working spaces is controlled by an axial slide valve arranged in the piston. The axis of the slide valve is perpenducular to the axis of the piston and it is in an offset position. The slide valve is actuated by the arm fixed to the steering nut. This arm turns with the steering nut to a limited extent, while the end of the arm, which extends into the cross hole of the slide valve forces the slide valve to an axial movement, whereby the necessary control movement is brought about. This solution is disadvantageous, since the force effects arising on the control slide valve at control, which are brought about on the control edges and in the sensing device in the slide valve, directly react on the steering nut. These forces apply an excentric load on the steering nut bringing about a radial reaction force, as well as a stalling torque parallel with the axis of the steering nut. Since the steering nut is fitted with a bearing in the axial direction only, the radial reaction force can not be taken up by the bearing. This force effect is transmitted through the balls arranged along the thread of the steering nut to the steering spindle and to its bearing. Since this force effect is not negligible (it is a value on the order of 1000 N), thus fitting the steering spindle with bearings on both sides is justified. This makes it necessary to increase the length of the steering spindle, its fitting with the bearing in the lower part of the steering box and to use a sliding tube, which—according to the diameter of the sliding tube—results in reducing the effective pressure surface of the piston, besides the additional cost. The friction arising in the bearings caused by the control and by the sensing force effects of the control slide valve and stalling torque, is also disadvantageous. This friction affects adversely the sensitivity of the control.

Further disadvantage is due to the fact, that the control mechanism is in an offset position in relation to the steering spindle. For this reason only a very limited space is available for the control mechanism (slide valve, control slots, oil ducts). Consequently the mechanism ensuring the mid-position of the control mechanism can be arranged only separately from the control mechanism. This way the mid-position of the control mechanism was set only in the power piston, aggravating the assembly phase of the production. Disassembly of the piston at the time of repair (e.g. change of balls at the ball thread) necessitates the readjustment of the control mechanism into the mid-position.

Such power steering gear is also known (Hungarian patent application No. 164 556), the cross slide valve control mechanism of which is arranged similarly in the piston. The cross slide valve and steering nut are connected with a two-armed lever. One end of the lever shaped as a spherical surface fits into the groove of the steering nut, while the other spherical end fits into the cross-hole of the slide valve. The axis of the lever is at an angle to the axis of the piston. Both ends of the steering nut are carried in bearing in the piston. These bearings are capable of taking up both the axial and radial stresses. A drawback of the solution is that the forces arising on the control slide valve are transmitted by the lever to the steering nut, consequently the steering nut should be provided with such a bearing, which takes up the axial, as well as the radial load. The lever transmits not only a radial load, but also a stalling torque on the steering nut. This torque is to be taken up similarly by the bearing of the steering nut. Both from the radial load on the steering nut and from the stalling torque, friction will arise in the bearings, which is undesirable with respect to the sensitivity of the control, since it will be deteriorated.

Another disadvantageous fact is, that in the solution according to the above, the steering nut and lever are long. Significant deformation occurs on the relatively long lever subjected to bending stress. This deformation causes delayed control during steering, which is a disturbing phenomenon concerning the driving of the vehicle.

The long steering nut and bearings subjected to a two-directional load result in a relatively costly solution.

The solution according to the present invention eliminates the disadvantages of the known and above mentioned solutions. The invention is aimed at the realization of a connection between the control slide valve arranged in the cover of the piston and the steering nut, where the force effects arising on the slide valve have no reaction whatsoever on the bearing of the steering nut, on the other hand the turning of the steering nut can be transformed with adequate sensitivity to the axial movement of the slide valve.

The objective of the invention was accomplished with the development of such driving mechanism, at which the steering nut transmits only a turning moment to the drive dog, furthermore the force effects arising on the slide valve react on the steering nut exclusively in the form of a turning moment.

The invention is a power-assisted steering gear, the box of which is formed as a power cylinder in a particular section, it has a double-acting piston in the power cylinder, which divides the interior of the box into two working spaces, it has an axially fixed steering spindle formed on the mantle surface of the piston and turnably embedded in the cover of the box, the control mechanism in the piston has an axial slide valve, the axis of which is perpendicular to the longitudinal axis of the piston, the control mechanism is connected with the liquid inlet and outlet ducts of the box, as well as with the working spaces by ducts, the steering nut is connected with a co-rotating, torque-transmitting drive dog, one bed of which that determines the axis of rotation is formed by the connection between the steering nut and drive dog, while the other similar bed is formed by the ball pivot fitting into the nest of the piston, and it has a further ball pivot fitting into the nest of the axial slide valve of the control mechanism set outside its axis of rotation.

The solution according to the invention has the advantage, that the steering nut is fitted with a bearing only against the axial force effect and it is sufficient to fit only one end of the steering spindle with a bearing. Through this solution the friction is smaller in the mechanical chain connecting the control slide valve with the steering spindle, which is favourable with respect to the sensitivity of the control. This means, that the difference between the manual moment and the controlling and sensing moment arising in the control mechanism—due to the reduced, undesirable disturbing frictions—is smaller and the kinetic connection is more correct. The solution results in the simpler contstruction of the mechanism at the same time.

The drive dog turns together with the steering nut in such a way, that the end of the toggle in the piston cover remains stationary, while its end in the cross slide valve moves together with the slide valve, thus bringing about the control motion. With regard to the fact, that the claws of the drive dog connected to the steering nut and the spherical ends of the toggle, each are in a plane perpendicular to the longitudinal axis of the piston, while a couple of forces arises on each of the claws of the drive dog and on the spherical ends of the toggle, which couple has no resultant force, only a resultant moment. Thus the turn of the steering nut transmits exclusively torque (turning moment) to the drive dog and the control slide valve transmits exclusively torque (turning moment) back to the steering nut.

The solution according to the invention has a further advantage by both surfaces of the power piston being functional surfaces, since the other end of the steering spindle needs no bearing. The steering nut needs no bearing either against the radial forces, thus the steering nut and its vicinity may be of simpler construction and of shorter dimension, which have a favourable effect on the full length of the steering gear.

A further advantage of the solution according to the invention is, that it enables the simple construction of the oil ducts as well. The oil inlet and outlet through sliding tubes from the lower part of the steering box as the nearest place to the control mechanism results in oil ducts of short and simple construction, which reduces the losses of the oil flow and represents constructional simplicity at the same time.

The arrangement according to the invention makes it possible to arrange not only the control mechanism, sensing device and the mechanism ensuring the mid-position of the control mechanism within the piston cover, but also such further structural part, which enables the infinite adjustment either of the geometric or hydraulic mid-position of the control mechanism without separate manufacturing process. This way the piston cover with the control mechanism within and with the mentioned further devices forms such an independent structural unit, which can be produced independently from the other structural parts of the power steering, and it can be fitted into the steering replaceably without separate adjustment, in a simple way.

An embodiment of the steering gear according to the invention is shown with the aid of FIGS. 1–6 wherein:

FIGS. 5 and 6 are longitudinal sections of a detail of the steering gear, showing the inlet of the oil into the steering gear and outlet of the oil from the steering gear.

Figure 1:
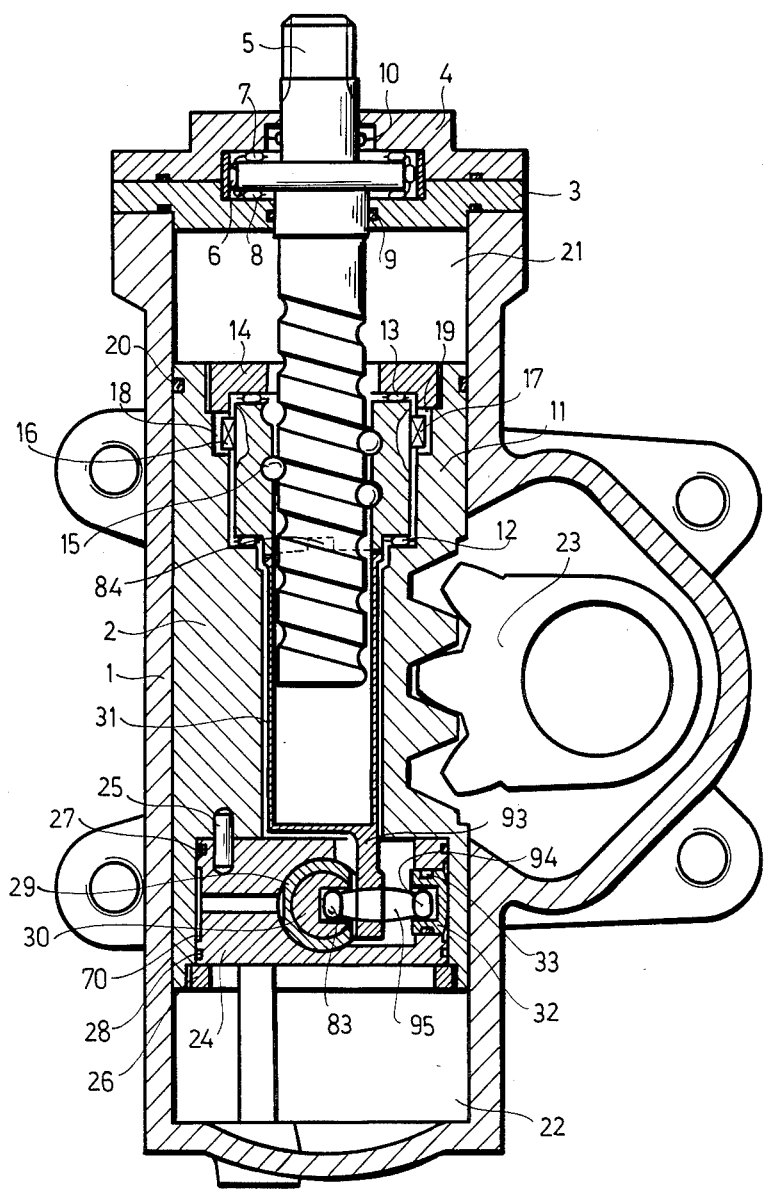
FIG. 1 illustrates the longitudinal section of the steering.

The double-acting piston 2 fits into the hole of box 1 formed as the power cylinder. Parts 3 and 4 of the divided upper cover are connected to the box 1, including the radial bearings 6 and 7 and axial bearing 8 of the steering spindle 5. The steering spindle 5 is sealed with the high-pressure packing 9 in cover 3 and with the low-pressure packing 10 in cover 4. The steering nut 11 is arranged in piston 2, fitted with axial bearings 12 and 13. The steering nut 11 is supported by screw 14 in piston 2. The steering nut 11 is fitted to the steering spindle 5 through balls 15. The ribs 16 and 17 of the steering nut 11 impact at the end of the control movement in the grooves 18 and 19 of piston 2, and they prevent the further turn. The oil seal 20 is arranged in the groove of piston 2, separating the pressure spaces 21 and 22 of box 1 from each other. The toothing formed on piston 2 fits into the toothing of the worm shaft 23, whereby the progressive movement of piston 2 is transformed to the rotary motion of the worm shaft 23.

The piston cover 24 fits into the nest 87 of piston 2, said cover being fixed by pin 25 against turn, and by screw 26 in the axial direction. Oil seals 27 and 28 are arranged on the external mantle surface of piston cover 24. The control tube 29 fits into the piston cover 24 with the axial slide valve 30 within. The axial slide valve 30 is connected by drive dog 31 to the steering nut 11. One of the ball pivots 83 of the drive dog 31 fits into the nest 91 of the axial slide valve 30, while the other ball pivot 81 fits into the nest 90 of bush 32.

The carrier 93 of the drive dog 31 is connected with claw connection 84 to the steering nut 11, and the pin 95 with ball ends 94 and 83 is fixed into the nest 92. Pin 95 is perpendicular to the axis of the steering spindle 5. The claw connection 84 connecting the steering nut 11 and drive dog 31 is formed with two claws, the diameter connecting their centreline in parallel with the axis of the axial slide valve 30. Bush 31 at the end of the packing 33 is arranged in a sealed condition in the piston cover 24. The sensing pistons 34 and 35 are arranged in the blind holes 88 and 90 formed in the axial slide valve 30, which with their ends 86 and 89 are supported by the nest-surface 87 of piston 2. The axial slide valve 30 is connected with thread to the threaded sleeve 36, at one end of which the shoulder 37, and at the other end the circlip 38 are arranged. The shoulder 39 is formed in control tube 29, supported by disc 40 and spring 41. The circlip 42 is arranged at the end of the control tube 29 supporting the ring 43 and the other end of spring 41.

The control grooves 44 and 45 are formed on the axial slide valve 30. Grooves 46, 47 and 48 are in the control tube 29 similarly for control purpose. The section between grooves 46 and 47 as well as the section between groove 47 and 48 form the ribs 49 and 50, being opposite the grooves 44 and 45 of the axial slide valve 30. The grooves 44 and 45 are wider than ribs 49 and 50, thereby the control slots 51, 52 and 53, 54 are brought about.

The space at the end of the sensing piston 34 being in the axial slide valve 30 is in connection through hole 55 with groove 45. Groove 45 is in connection with the lower pressure space 22 through hole 56 formed in the control tube 29 and through hole 57 formed in the piston cover 24. The space at the end of the sensing piston 35 being in axial slide valve 30 is in connection with pressure space 21 through hole 58.

The hole 59 formed in the part of box 1 facing the pressure space 22 is in connection through the sliding tube 60 with hole 61 formed in piston 2. The sliding tube 60 is sealed by packing 62 in box 1. The sliding tube passes through hole 63 of the piston cover 24, in which the sliding tube 60 is sealed by oil seal 64. Packing 65 is between the piston 2 and piston cover 24. Duct 66 is in piston cover 24, and duct 67 in control tube 29, which ducts form a connection between the hole 63 of piston cover 24 and the groove 47 of the control tube 29.

Also duct 68 is formed in the control tube 29 connected with groove 46. Hole 69 is in piston cover 24 between duct 68 and ring space 70, formed on the external surface of piston cover 24. Hole 71 is also in the piston cover 24 connected through cross hole 72 to the ring space 70.

Hole 71 is in connection with hole 73 formed in piston 2, with sliding tube 74 extending into it. The sliding tube is sealed in the piston cover 24 by packing 75 and in the piston 2 by packing 76, fixed with the circlip 78 in the hole 77 of box 1. Packing 79 is arranged between piston 2 and piston cover 24. Hole 80 is formed in the control tube 29, connected to groove 44 of the axial slide valve 30. Duct 81 is in piston cover 24 and duct 82 in piston 2, which form a connection between the upper pressure space 21 and groove 44 of the axial slide valve 30. Groove 48 of the control tube 29 is in connection with ring space 70 not shown in the drawing.

Operation of the steering gear is as follows.

As a mechanical steering gear it is provided with ball thread and rack and pinion-segmental power transmission. The steering nut 11 turns with the steering spindle 5 until its ribs 16 and 17 impact in grooves 18 and 19 of piston 2, and prevent the steering nut from further turn. At further turn of the steering spindle 5 the steering nut 11 is forced to a motion synchronous with piston 2 and the rack of piston 2 turns the toothed segment of the worm shaft 23, thus the mechanical steering is brought about.

In the case of power steering, the path of oil in midposition of the control mechanism is as follows:

The hole 59 of box 1 is in connection through a pipe with the delivery side of the not illustrated pump. The oil passes from hole 59 through sliding tube 60 into the hole 61 of piston 2, then into the hole 63 of the piston cover 24. The oil passes further in duct 66 into the duct 67 of the control tube 29, which is in connection with groove 47. Since the control mechanism is in mid-position, all control slots are open. The oil passes from groove 47 through control slots 52 and 53 into the grooves 44 and 45 of the axial slide valve 30. From groove 44 it passes through control slot 51 into the groove 48 of the control slide valve 29, then into the ring space 70, and simultaneously from groove 45 through control slot 54 into the groove 46 of the control tube 29. The groove 46 is in connection through duct 66 and hole 69 with the ring space 70. From the ring space 70 the oil passes through hole 72 of piston cover 24 in the longitudinal hole 71, then into hole 73 os piston 2, from where through the sliding tube 74 to the hole 77 of box 1, which is in connection with the pump tank through a pipe. From the tank of the pump the oil passes to the inlet side of the pump, thus the full oil cycle is brought about.

Figure 2:
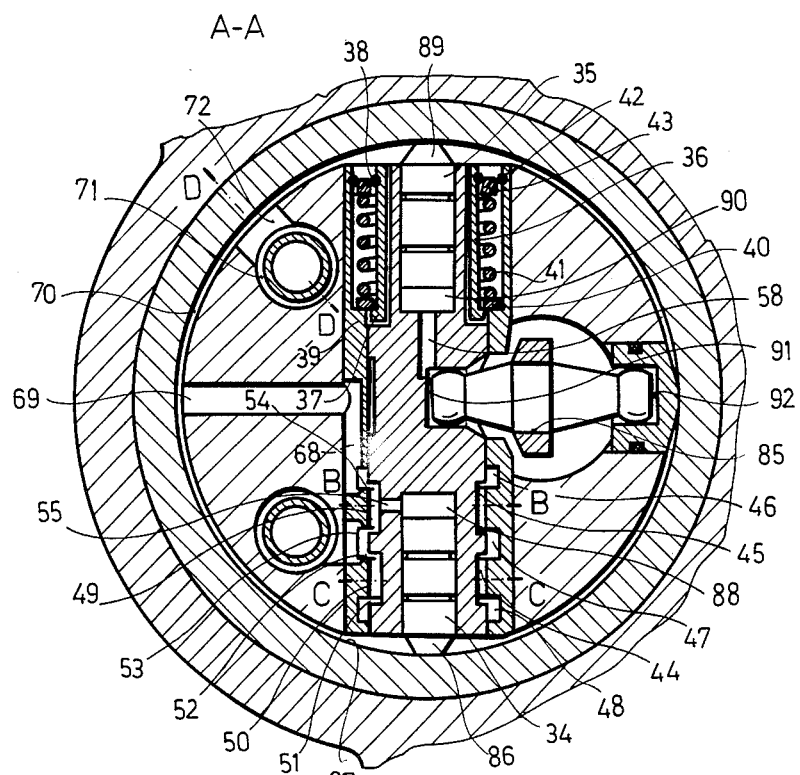
FIG. 2 is a cross section of the power piston of the steering in the central plane of the control mechanism.
Figure 3:
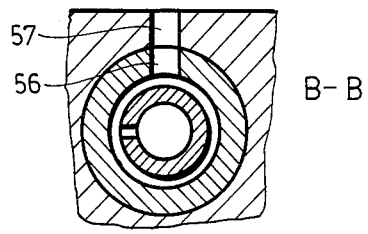
FIGS. 3 and 4 are cross sectional views of the control mechanism with the oil ducts.
Figure 4:
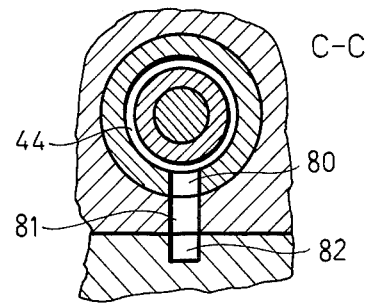

Looking from the outer end of the steering spindle, and steering in clockwise direction, the power-assisted steering is brought about as follows:

Turning the steering spindle 5 clockwise and assuming resistance on the worm shaft 23 through the external rods, also the steering nut turns in the same direction of rotation through the intermediation of balls 15. The worm shaft 23 supports the piston 2 against turning. The steering nut 11 turns the connected drive dog 31 as well in the clockwise direction of rotation around the claw connection 84 and ball pivot 94. Since the ball pivot of the drive dog 31 in bush 32 is supported, thus the other ball pivot in the axial slide valve 30 moves by taking along the axial slide valve 30 (FIG. 2 looking from bottom upwards). The axial slide valve 30 moving in the control tube 29 compresses the spring 41 through sleeve 36 fitted with thread onto the axial slide valve 30. Due to the movement of the axial slide valve 30 in the control tube 29, the control slots 51 and 52 get into closed position, and simultaneously the control slots 52 and 52 increase their size. The oil passing from the delivery side of the pump—as described earlier—into the groove 47 of the control tube 29, can pass from here only through the control slots 52, because the control slot 53 is already closed. But the control slot 51 is also closed, hence the oil passing through the control slot 52 into the groove 44 of the axial slide valve 30, passes through the hole 80 of the control tube 29 into the duct 81 of piston cover 24, then through duct 82 of piston 2 into the pressure space 21, performing its work here by movement of the piston 2. When the driver of the vehicle turns the steering spindle 5 through the steering wheel and steering column in clockwise direction, then—in case of left-threaded steering spindle 5 and steering nut 11—the piston 2 is forced to a motion receding from the steering spindle 5. Such motion is forced on the piston 2 also by the oil, thus the power effect is brought about. Simultaneously with this process the oil can pass out of the pressure space 22 at the other end of the piston 2 to the oil tank of the pump as follows:

The pressure space 22 is in connection with the groove 45 of the axial slide valve 30 through the hole 57 of piston cover 24 and hole 56 of the control tube 29. Thus the oil flows from the pressure space 22—in the described way—into the groove 45 of the axial slide valve 30, then through the enlarged control slot 54 into the groove 46 of the control tube 29. From here the oil passes through duct 68 and hole 69 into the ring space 70. The ring 70 is in connection with the sliding tube 74 and with hole 77 of the box 1 through holes 72, 71 and 73, from where the oil passes into the tank of the pump.

At steering in clockwise direction—as described earlier—the axial slide valve 30—as shown in FIG. 2—moves from the bottom upwards. The space below the end of the sensing piston 35 in the axial slide valve 30 is in connection with the pressure space 22 through hole 58, thus the force corresponding to the pressure of the pressure space 21 and cross section of the sensing piston 35, presses the end 89 of the sensing piston 35 against the internal mantle surface 87 of piston 2, while it pushes the axial slide valve 30 down, thus it acts against the motion bringing about the control. The control movement can be upheld, if the driver overcomes the compressive force on the steering wheel acting on the axial slide valve 30. Since this force is in proportion with the steering resistance arising on the steering wheel of the vehicle, this way the driver can sense the external resistance. In this case both forces of the sensing piston 34 are under identical pressure, thus at this steering direction it has no role in the process of re-sensing.

When the driver stops the manual moment on the steering wheel, the control mechanism gets again into mid-position, and the power effect stops. Spring 41 pushes back the axial slide valve 30 into mid-position through sleeve 36. The compressive force acting on the axial slide valve 30 and bringing about the re-sensing, has a similar effect.

Similar process takes place, when steering in anticlockwise direction of rotation, due to the symmetrical arrangement of the control slots.

What we claim is:

1. In a power-assisted steering gear of the type having a box having a cover and formed as a power cylinder with a double-acting piston having a nest and that divides the interior of the box into two working spaces, a rack connected with a toothed segment of a worm shaft, the rack being disposed on the surface of the piston and contained in the box, an axially fixed steering spindle rotatably embedded in the cover of the box, an axially fixed steering nut connected to the steering spindle embedded in the piston and turnable to a limited extent, a control mechanism arranged in the piston having an axial slide valve having a nest, the axis of which is perpendicular to the longitudinal axis of the piston, the control mechanism connected with ducts to fluid inlet and outlet ducts of the box and to the working spaces, the improvement comprising a moment-transmitting drive member connected to and rotatable with the steering nut, the drive member having first means defining an axis of rotation which is formed by the connection between the steering nut and the drive member and a first ball pivot fitting into the nest of the double-acting piston, the drive member further including a second ball pivot fitting into the nest of the axial slide valve and wherein the axis of the axial slide valve intersects the axis of the steering spindle and further comprising two claws between the steering nut and drive member forming a claw connection and wherein the diameter connecting the center line of the two claws is parallel to the axis of the axial slide valve.

2. In a power-assisted steering gear of the type having a box having a cover and formed as a power cylinder with a double-acting piston having a nest and that divides the interior of the box into two working spaces, a rack connected with a toothed segment of a worm shaft, the rack being disposed on the surface of the piston and contained in the box, an axially fixed steering spindle rotatably embedded in the cover of the box, an axially fixed steering nut connected to the steering spindle embedded in the piston and turnable to a limited extent, a control mechanism arranged in the piston having an axial slide valve having a nest, the axis of which is perpendicular to the longitudinal axis of the piston, the control mechanism connected with ducts to fluid inlet and outlet ducts of the box and to the working spaces, the improvement comprising a moment-transmitting drive member connected to and rotatable with the steering nut, the drive member having first means defining an axis of rotation which is formed by the connection between the steering nut and the drive member and a first ball pivot fitting into the nest of the double-acting piston, the drive member further including a second ball pivot fitting into the nest of the axial slide valve and wherein the ducts connecting the box and control mechanism comprise fluid inlet and fluid outlet tubes fixed in the box and sealed in the piston cover and holes connecting the tubes with the control mechanism.

3. The power steering gear as claimed in claim 2, further comprising a spring supported by the axial slide valve.

4. The power steering gear as claimed in claim 3, wherein the spring is supported on the axial slide valve by a threaded sleeve connected to the axial slide valve.

5. The power steering gear as claimed in claim 3, further comprising blind holes at each of the axial slide valve in constant connection through ducts with each working space and sensing pistons supported by a counter-surface of the piston arranged in each blind hole.

* * * * *